Aug. 22, 1972  I. H. LEACH  3,686,068
SHREDDED POLYSTYRENE FOAMS

Original Filed July 25, 1969  2 Sheets-Sheet 1

INVENTOR.
IRBY H. LEACH
BY
Townsend and Townsend
ATTORNEYS

INVENTOR.
IRBY H. LEACH
BY
Townsend and Townsend
ATTORNEYS

United States Patent Office 3,686,068
Patented Aug. 22, 1972

3,686,068
SHREDDED POLYSTYRENE FOAMS
Irby H. Leach, 2094 Emerson,
Napa, Calif. 94558
Original application July 25, 1969, Ser. No. 844,896, now Patent No. 3,627,211. Divided and this application Feb. 24, 1971, Ser. No. 118,483
Int. Cl. B32b 5/16; C08d 13/00; C08f 47/00
U.S. Cl. 161—168
4 Claims

ABSTRACT OF THE DISCLOSURE

Foam, such as foamed beads, are shredded into irregularly shaped particles having random and irregular exterior surfaces, tears and ragged edges to rupture and open a substantial number of the foam cells. The foam beads are passed between relatively moving, opposing shredding surfaces including tooth-like serrations. Oversize shredded particles are separated on a screen from which they are recycled for reshredding and size reduction. The apparatus also includes means for feeding the foam beads to the shredding surfaces and collecting the shredded and screened particles for removal from the apparatus.

RELATED APPLICATIONS

This is a division of application Ser. No. 844,896, filed July 25, 1969 now U.S. Pat. 3,627,211.

This patent application is related to the co-pending, commonly owned patent applications bearing Ser. No. 844,344 filed July 25, 1969 now U.S. Pat. 3,639,551, for Method for Producing Low-density Polystyrene Foam, and Ser. No. 844,895 filed July 25, 1969 now U.S. Pat. 3,630,820, for Granular Formations Including Open Cell Polystyrene Particles.

BACKGROUND OF THE INVENTION

There is a wide need for shredded foam materials as a filler, a base material or for providing means to reduce the density of heavy, high density materials. Particulars of the latter application are contained in the second patent application referred to above.

Low density, low-cost foam is most commonly available in the form of foamed or expanded polystyrene beads. For example, see the first listed patent application referred to above which enables the production of polystyrene foam having densities of as low as 0.2 pound per cubic foot on an economical basis.

In the prior art, the reduction of the foam into small particle sizes generally provided for the cutting or chopping of the foam. This yields clean cut particles having an appealing appearance and has the further advantage that virtually any particle size can be obtained. However, the cut surface areas on the finished particles are relativell small. Consequently, the number of foam cells opened by the cuts is relatively small since the surface areas created by the cuts intersect only a few foam cells.

In many applications it is desirable to maximize or at least have a substantial number of open cells for the subsequent processing of the foam particles. The nature of the size reduction of the foam in accordance with prior art methods and apparatus runs counter to that objective since the surface area of a foamed particle of a given size requires a maximization of such surfaces, as by giving them an irregular and uneven configuration, instead of a planar configuration obtained in the prior art.

SUMMARY OF THE INVENTION

The present invention provides a method and apparatus to form small size foam particles having a substantial number of open cells. The particles are shredded by passing them between two relatively moving tearing surfaces defined by tooth-shaped serrations. The particles have randomly disposed, non-planar exterior surfaces, including tears extending from the surfaces towards the interior of the particles and serrated ridges to maximize the areas of the various surfaces and to thereby intersect and open a substantial number of theretofore closed foam cells.

The apparatus of the present invention comprises a housing mounting on its interior a pair of spaced apart parallel shredding rolls having the above mentioned tear surfaces. The rolls are rotated so that the surfaces move at differing speeds. A screen is placed beneath the rolls for separating excessively large particles. Particles passing the screen are collected and introduced into an air stream for removal from the housing. The screen is so shaped that excessively large particles are placed closely adjacent the periphery of the shredding rolls whereby the rotational movement of the rolls, through physical contact and/or an air stream induced by the rotating rolls transports the oversize particles for recycling and further size reduction. The apparatus is also provided with chute means to introduce the foam, preferably in the form of foam beads, to the shredding rolls.

The apparatus permits a high volume production of small size shredded foam particles which are ideally suited for the subsequent use of the particles in applications requiring open cells. In a preferred embodiment of the invention the shredding rolls are defined by a plurality of large and small diameter, axially spaced shredding discs which are so arranged that the large diameter discs interlace and face small diameter discs on the opposite roll. The housing is so positioned that the axes of the shredding rolls lie in a substantially horizontal plane and the rolls are rotated in opposing directions so that particles deposited on top of the rolls are drawn into the gap between the rolls. The particle sizes can be varied by increasing or decreasing the gap between the rolls and by selecting a screen of the proper mesh size. To assure removal of excessively large particles from the top surface of the screen the spacing between the latter and the periphery of the rolls is controlled as more fully set forth hereinafter.

DESCRIPTION OF THE PREFERRED EMBODIMENTS

Figure 1:
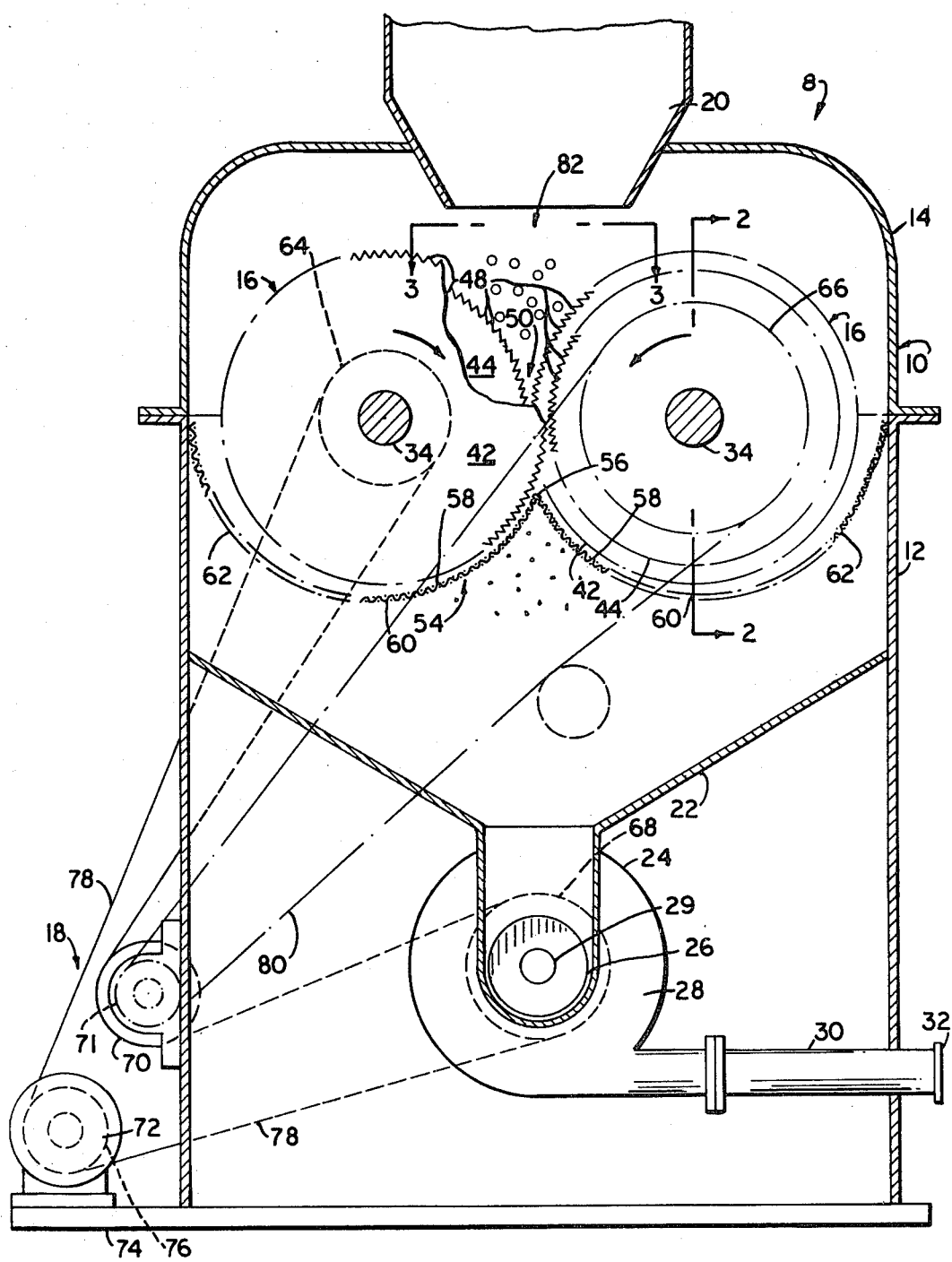
FIG. 1 is a schematic front elevational view, with parts broken away, of a shredding apparatus for the manufacture of shredded, open cell foam particles.
Figure 2:
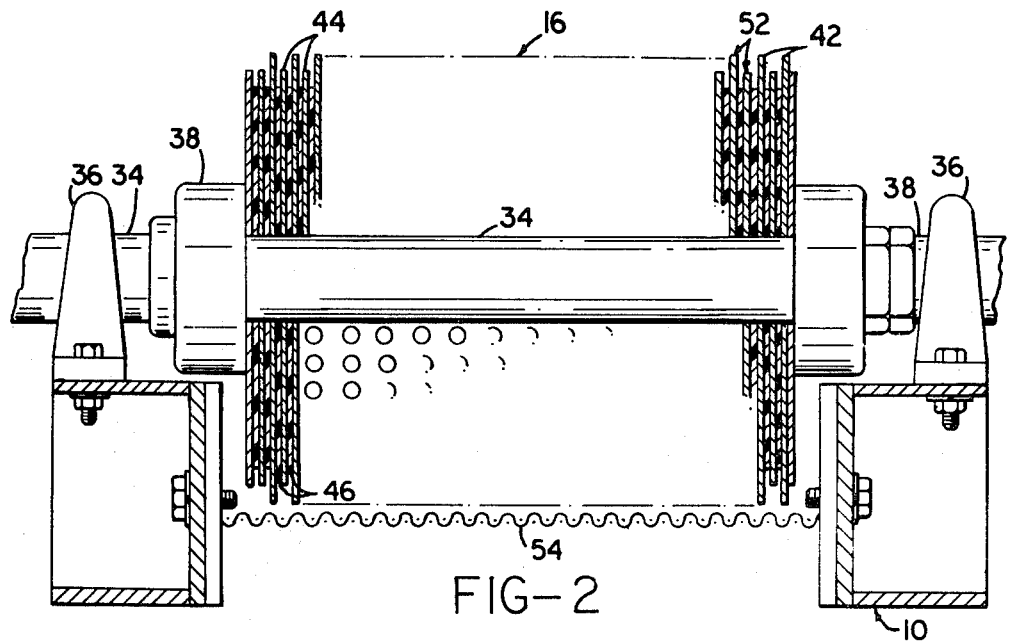
FIG. 2 is an enlarged elevational view, in section, and is taken on line 2—2 of FIG. 1.
Figure 3:
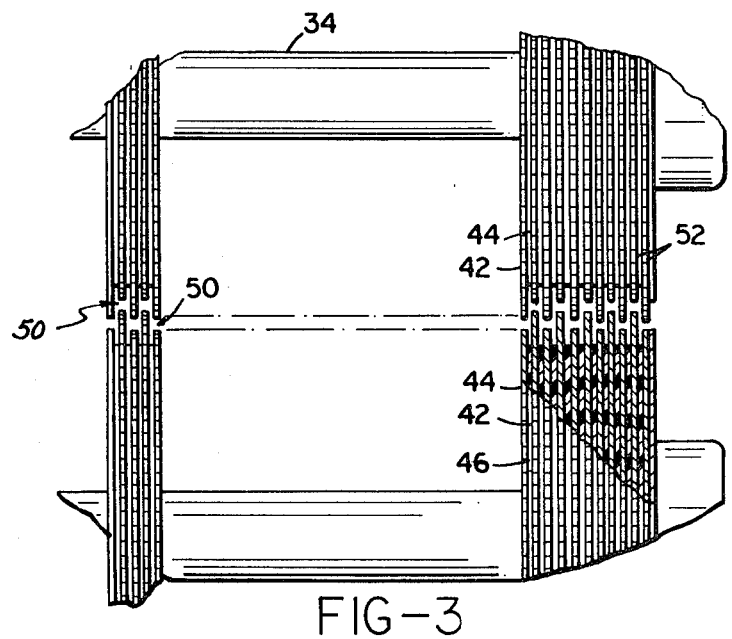
FIG. 3 is a fragmentary, enlarged plan view in section, of the intermeshing tearing surfaces of the apparatus illustrated in FIG. 1 and is taken on line 3—3 of FIG. 1.

Referring to FIGS. 1 through 3, a shredding machine 8 comprises an upright housing 10 defined by a base section 12 and a cover 14 demountably secured to the top of the base section. A pair of intermeshing shredded rolls 16 are rotatably mounted and disposed interiorly of the housing and actuated by drive means 18. A chute 20 is secured to cover 14 and positioned substantially vertically above the median between the two shredder rolls. The base section includes a collector funnel 22 beneath the rolls that terminates in a passageway 24 leading into a suction side 26 of an air blower 28. The impeller of the blower is also driven by drive means 18. The pressure side of the blower is connected to a conduit 30 terminating at the exterior of housing 10 in a connecting flange 32.

In operation particles to be shredded enter through chute 20, are shredded or torn by the co-action of the shredder rolls 16, are collected by funnel 22 and fed to the suction side 26 of blower 28 for transport to a point of use as more fully described hereinafter.

The shredder rolls are preferably of identical construction and each comprises a shaft 34 rotatably mounted in journal bearings 36 secured to the exterior of the housing 10 in a conventional manner. One side of the shaft includes an annular ring 38 while another side of the shaft includes a threaded portion 40. Both the ring and the threaded portion are inward of the shaft extremities which extend through the journal bearings. A multiplicity of large and small diameter, circular disc-shaped tear plates 42 and 44, respectively, are alternatingly spaced over the length of shaft 34 between ring 38 and threaded portion 40. The tear plates are spaced apart by spacers 46 a distance about equal to or slightly greater than the thickness of the tear plates. The periphery of the tear plates includes regularly spaced, transverse and generally toothshaped serrations 48 which have a depth of between about $\frac{1}{64}$ to about $\frac{3}{16}$ inch, the preferred depth range being between about $\frac{1}{16}$ to about $\frac{1}{8}$ inch for the shredding of foamed polystyrene beads as more fully described hereinafter.

Referring particularly to FIGS. 1 and 3, the actual spacing between shafts 34 of the shredder rolls is slightly greater than the combined radii of the small and the large diameter tear plates 42 and 44 but is less than the combined distance of the radii of two large tear plates 42 so that the tear plates of the two shredder rolls overlap (as best shown in FIGS. 1 and 3) and the tear plates interlace. There remains a narrow gap 50 between the tear surfaces 52 of opposing tear plates of the two shredder rolls. The magnitude of the gap is a function of the desired size of the shredded particles. For the shredding of foamed polystyrene beads having a density of between about 0.2 and about 0.5 pound per cubic foot, an expanded bead size of between about $\frac{1}{4}$ to about $\frac{3}{4}$ inch diameter, and a desired shredded maximum particle size of about $\frac{3}{16}$ inch, gap 50 has a width of about $\frac{1}{32}$ inch.

Referring again to FIGS. 1 through 3, a screen 54 is placed beneath shredder rolls 16 and is secured to side walls of housing base section 12 in a conventional manner as with threaded bolts. Generally, the screen has a double crescent shape (as shown in FIG. 1) and is defined by a center ridge 56, a first screen section 58 between the center ridge and a point 60 about vertically below the shaft 34, and a second screen section 62 extending from point 60 to housing base section 12.

The first screen section has a circular configuration with the center of the circle being the axis of the corresponding shredder shaft 34 so that the screen section is parallel to the tear surfaces of the tear plates 42, 44. The radius of the first screen section is such that the spacing between the section and the tear surfaces is in the range not exceeding the maximum desired average dimension of the shredded particles plus about $\frac{1}{16}$ inch. In the above example in which polystyrene foam particles are shredded to a maximum dimension of about $\frac{3}{16}$ inch the spacing between the tear plate tear surfaces 52 and the first screen section 58, in a radial direction, is about $\frac{1}{16}$ inch.

The second screen section is excentric with the tear plates and the spacing, in a radial direction, between the tear surfaces and the second screen section increases gradually and continuously from adjacent point 60 to the end of the second screen section. The maximum spacing between the tear surfaces and the end of the second section is not critical.

The screen as such may be constructed of a variety of materials or screen openings which permit the passage of the desired particle sizes and prevent particles having excess dimensions from passing the screen.

It is presently preferred to construct the screen of stamped-out sheet metal which lends itself readily to forming to give it the desired shape. If convenient, other materials, such as wire mesh, can be employed.

The dimensioning and shaping of the screen 54 is important to prevent shredded particles from clogging the space between the tear surfaces and the screen which can render the shredder inoperable. Contrary to the expected effect, an increase in the spacing between the tear surfaces and the screen beyond the above stated range leads to an increased tendency of clogging. The exact dimensionality of the spacing between the tear surfaces and the first screen sections 58 is further a function of the material being shredded and may require periodic adjustments of the spacing.

To enable the ready transport of oversized shredded particles away from beneath the shredded rolls the second screen sections 62 open up. Oversize shredded particles incapable of passing through the screen are thereby recirculated by the shredder rolls (as described below) into the upper space of housing cover 14 for reshredding. Waste of oversize particles is prevented and the recirculation and reshredding is accomplished without additional feeding mechanisms and the like.

Referring to FIGS. 1 and 3, drive means 18 is schematically illustrated and comprises a relatively small diameter pulley 64 mounted to one of the extremities of the left hand shredder shaft 34 (as seen in FIG. 1), a relatively large diameter pulley 66 mounted to the extremity of the right hand shredder shaft and a pulley 68 mounted to the extremity of air blower shaft 29 on the side of housing 10 so that it is aligned with pulley 64. A pair of axially spaced idler pulleys 70, 71 are interconnected and mounted on the exterior of housing 10. Each idler pulley is aligned with one of the shredder pulleys 64, 66.

A conventional electric motor 72 is mounted to a support plate 74 and includes a pulley 76 over which a belt 78 is looped. Belt 78 is further looped over one of the idler pulleys 70, blower pulleys 68 and the left hand, small diameter shredder roll pulley 64. A second belt 80 is looped over the second idler pulley 71 and the right hand, large diameter shredder roll pulley 66. The electric motor is hooked up so that its pulley rotates in a clockwise direction whereby the left hand shredder roll also rotates in a clockwise direction and the right hand shredder roll (as seen in FIG. 1) rotates in a counterclockwise direction. Materials being shredded and entering the shredding machine 8 through chute 20 are thereby drawn into gap 50 between tear surfaces 52.

Aside from rotating in opposing directions the tear surfaces 52 move at different relative speeds. Consequently pulleys 64, 66, 70 and 71 are arranged so that one of the shredder rolls, say the left hand roll, rotates at a higher r.p.m. than the left hand roll. In a presently preferred embodiment of the invention the pulleys are arranged so that the relative speed differential between the tear surfaces, and therefore the r.p.m. differential between rolls, is between about 1:1.5 to about 1:6, with the preferred speed differential being about 1:4.

Turning now to the operation of the shredding apparatus, with particular reference to the shredding of the above mentioned foamed polystyrene beads, the beads enter through chute 20 and fall gravitationally into space 82 between and above the two shredder rolls 16. Serrations 48 of tear plates 42, 44 grasp the beads and pull them downwardly. Due to the speed differential of the tear surfaces 52 the beads are shredded into small particles 84 (shown in FIG. 5) in gap 50 between the tear surfaces. The movement of the tear surfaces transports the particles downwardly until they contact screen 54. Those particles which are smaller than the screen openings fall through the openings and hence unto collector funnel 22. The suction at suction side 26 of air blower enhances the passage of those particles through the screen and their movement towards the blower. Shredded particles which are large, i.e. which have a dimension greater than the maximum dimension of the screen openings, are prevented from passing the screen. They remain on the upper surface of the screen and are transported in the direction of rotation of the shredder rolls 16 towards the second screen sections 62. This removal of the excessively large particles is aided by direct contact between serrations 48 and such particles and by air movements or currents in the vicinity of the tear plate peripheries caused by the relatively high speed of the rolls. Thus, the oversize particles are in effect blown into the upper portion of housing cover 14 and into space 82 from where they are recycled through the shredder rolls for reshredding and size reduction.

Figure 4:
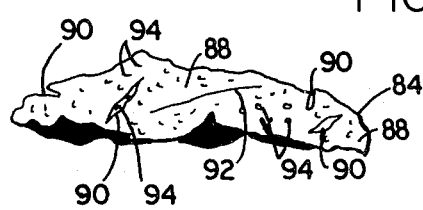
FIG. 4 is a plan view of a foamed particle shredded in accordance with the present invention.

Referring briefly to FIG. 4, a shredded particle 84 is illustrated. It has a generally elongate configuration, although the particle can also have a more compact shape since all particle dimensions, shapes, etc. are purely random. The particle includes a randomly shaped, non-planar and uneven exterior surface 88, randomly disposed, sized and formed tears 90 extending from the exterior surface towards the center of the particle and ragged or serrated ridges or edges 92. The total exterior surface area of the particle is therefore defined by the exterior surfaces, the surfaces defined by the tears and those defined by the ridges. These surfaces intersect large numbers of formerly closed foam cells 94 which therefore become open cells.

I claim:

1. An open cell foamed polystyrene product defined by randomly disposed, ruptured and non-planar exterior surfaces including torn indentations in the surfaces and ragged projections protruding from the surfaces so that a substantial portion of the cells communicate with the exterior atmosphere.

2. An article of manufacture according to claim 1 wherein the density of the foamed polystyrene is less than about 0.5 pound per cubic foot.

3. An article of manufacture according to claim 1 wherein the maximum dimension of the article is no more than about 3/16 inch.

4. A foamed acrylonitrile styrene copolymer particle obtained from closed cell foamed acrylonitrile styrene copolymer beads, the particle being defined by non-planar, randomly distributed and uneven exterior surfaces, randomly distributed tears extending from the exterior surfaces towards the interior of the particle, randomly distributed serrated ridge members, and a substantial number of open foam cells defined by the intersection of cell walls and surfaces of the particle, surfaces defined by the tears and surfaces defined by the ridge members.

References Cited

UNITED STATES PATENTS

| | | | |
|---|---|---|---|
| 3,267,187 | 8/1966 | Slosberg et al. | 161—162 |
| 3,598,672 | 8/1971 | Heller | 161—159 UX |

WILLIAM J. VAN BALEN, Primary Examiner

U.S. Cl. X.R.

161—159, 162; 260—2.5 B, 2.5 HB